(12) United States Patent
Hall

(10) Patent No.: US 7,020,792 B2
(45) Date of Patent: Mar. 28, 2006

(54) METHOD AND APPARATUS FOR TIME DOMAIN EQUALIZATION

(75) Inventor: Stephen H. Hall, Timber, OR (US)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 10/135,131

(22) Filed: Apr. 30, 2002

(65) Prior Publication Data

US 2003/0204765 A1 Oct. 30, 2003

(51) Int. Cl.
G06F 13/42 (2006.01)
G06F 5/00 (2006.01)
H03K 5/13 (2006.01)
H03K 11/26 (2006.01)

(52) U.S. Cl. ............... 713/401; 713/400; 327/250; 327/261

(58) Field of Classification Search ............... 713/401; 327/261, 270, 393, 395, 400, 250; 333/18; 370/516, 517; 455/67.16, 242.1
See application file for complete search history.

(56) References Cited

U.S. PATENT DOCUMENTS 4,890,022 A * 12/1989 Endo ............... 327/261
5,471,165 A * 11/1995 Liedberg ............ 327/250
5,544,175 A * 8/1996 Posse ............... 714/736
5,872,959 A * 2/1999 Nguyen et al. ....... 713/401

\* cited by examiner

Primary Examiner—Lynne H. Browne
Assistant Examiner—Stefan Stoynov
(74) Attorney, Agent, or Firm—Trop, Pruner & Hu, P.C.

(57) ABSTRACT

A method and apparatus is described that may be utilized to equalize modal velocity changes on a data bus. Modal velocity changes may be equalized by use of variable delays that may be used to equalize modal velocity changes.

20 Claims, 4 Drawing Sheets

METHOD AND APPARATUS FOR TIME DOMAIN EQUALIZATION

FIELD OF THE INVENTION

This invention relates broadly to the field of computers and in particular to the time domain equalization of signals utilized by the computer.

BACKGROUND

In multi-conductor bus systems, such as data and address buses on computer motherboards, cross talk between signals on the bus may cause modal velocity changes that depend on the transmitted data pattern. These modal velocity changes may significantly degrade the timing margins of digital systems and substantially decrease the maximum data rate that the bus can support. The effect may be especially significant for conventionally four-layer motherboards that may be utilized by manufacturers to conform to cost and volume structures in the industry. These modal velocity changes may provide an incentive for manufacturers to transition from four-layer motherboards to six or eight layer motherboards to address margin and other issues related to the modal velocity of the data on buses.

However, generally the more layers that are required to manufacture a motherboard the more costly the motherboard may become. Given the extreme cost sensitivity in a computer industry, increasing the cost of a component such as motherboard may not be desirable.

Therefore, there is a continuing need to address modal velocity changes and other issues in multi-conductor systems.

BRIEF DESCRIPTION OF THE DRAWINGS

Features and advantages of embodiments of the claimed subject matter will become apparent as the following detailed description proceeds, and upon reference to the drawings, where in like numerals to pick like parts, and in which:

It should be understood that although the following detailed description will proceed with reference being made to illustrative embodiments of the claimed subject matter, many alternatives, modifications, and variations thereof will be apparent to those skilled in the art. Accordingly, it is intended that the claimed subject matter be viewed broadly and be defined only as set forth in the accompanied claims.

DETAILED DESCRIPTION

Figure 1:
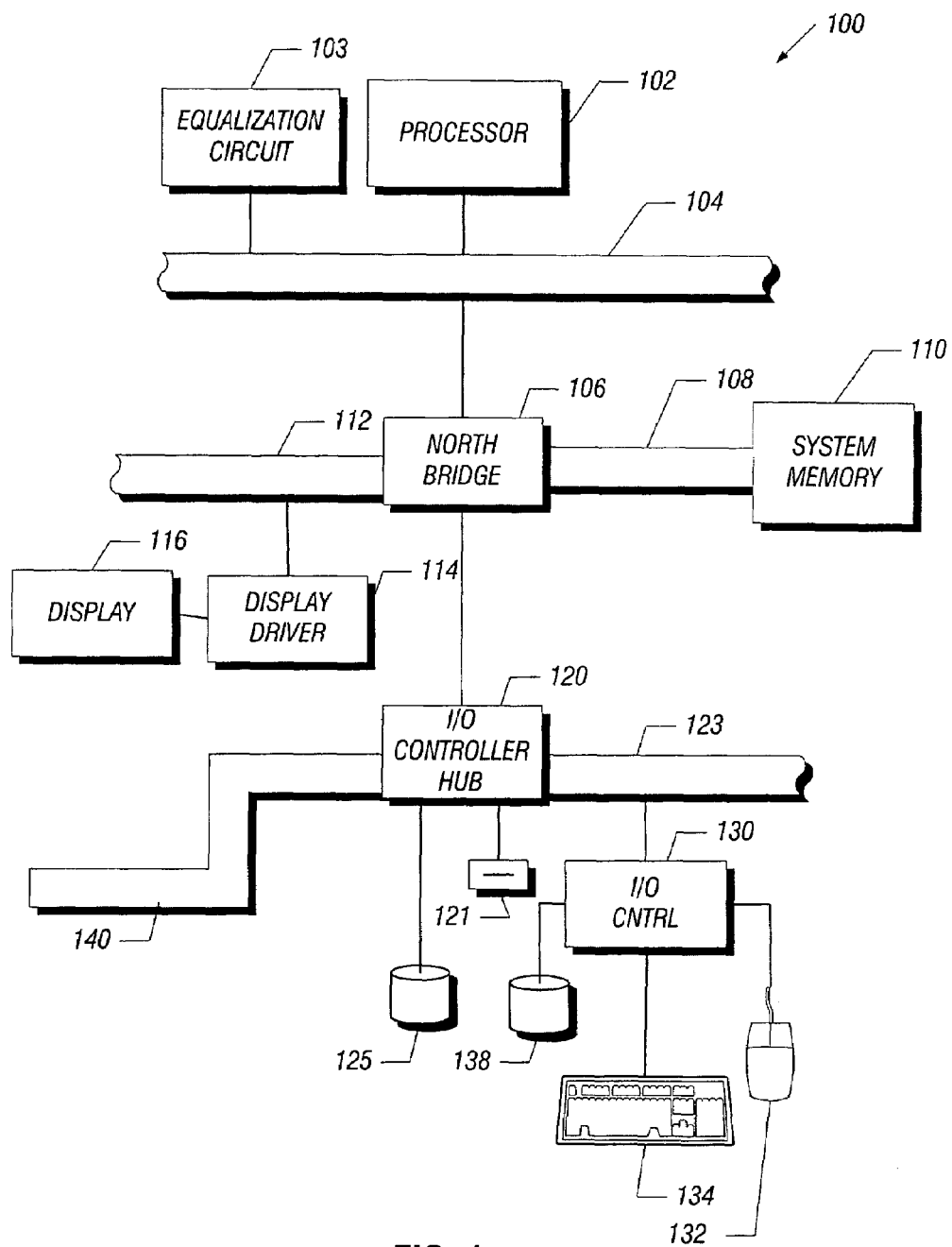
FIG. 1 is a block diagram of a computer system in accordance to an embodiment of the present invention.

Referring to FIG. 1, a computer 100 may include a processor (one or more microprocessors, for example) 102, that may be coupled to an equalization circuit 103 that may be coupled to a local bus 104. Also coupled to local bus 104 maybe, for example, a memory hub, or north bridge 106. The north bridge 106 provides interfaces to the local bus 104, a memory bus 108, an Accelerated Graphics Port (AGP) bus 112, and a hub link. The AGP bus is described in detail in the Accelerated Graphics Port Interface Specification, revision 1.0, published Jul. 31, 1996 by Intel Corporation, Santa Clara, Calif.

A system memory 110 may be accessed via the system bus 108, and an AGP device 114 may communicate over the AGP bus 112 and generate signals to drive a display 116. The system memory 110 may store various program instructions such as instructions for an operating system and application programs that may be utilized with the computer 100.

The north bridge 106 may communicate with a south bridge 120 over a hub link. In this manner, the south bridge 120 may provide an interface for the input/output (I/O) expansion bus 123 and a Peripheral Component Interconnect (PCI) bus 140. The PCI Specification is available from the PCI Special Interest Group, Portland, Oreg., 97214. An I/O controller 130 maybe coupled to the I/O expansion bus 123 and may receive input from a mouse 132 and a keyboard 134 as well as control operations on a floppy disk 138. The south bridge 120 may, for example, control the operations of a hard disk 125 and a compact disk read only memory (CD-ROM) drive 121.

The equalization circuit 103 may provide modal velocity equalization of signals from the processor 102 to devices that may be coupled to bus 104 as may be described below.

Figure 2:
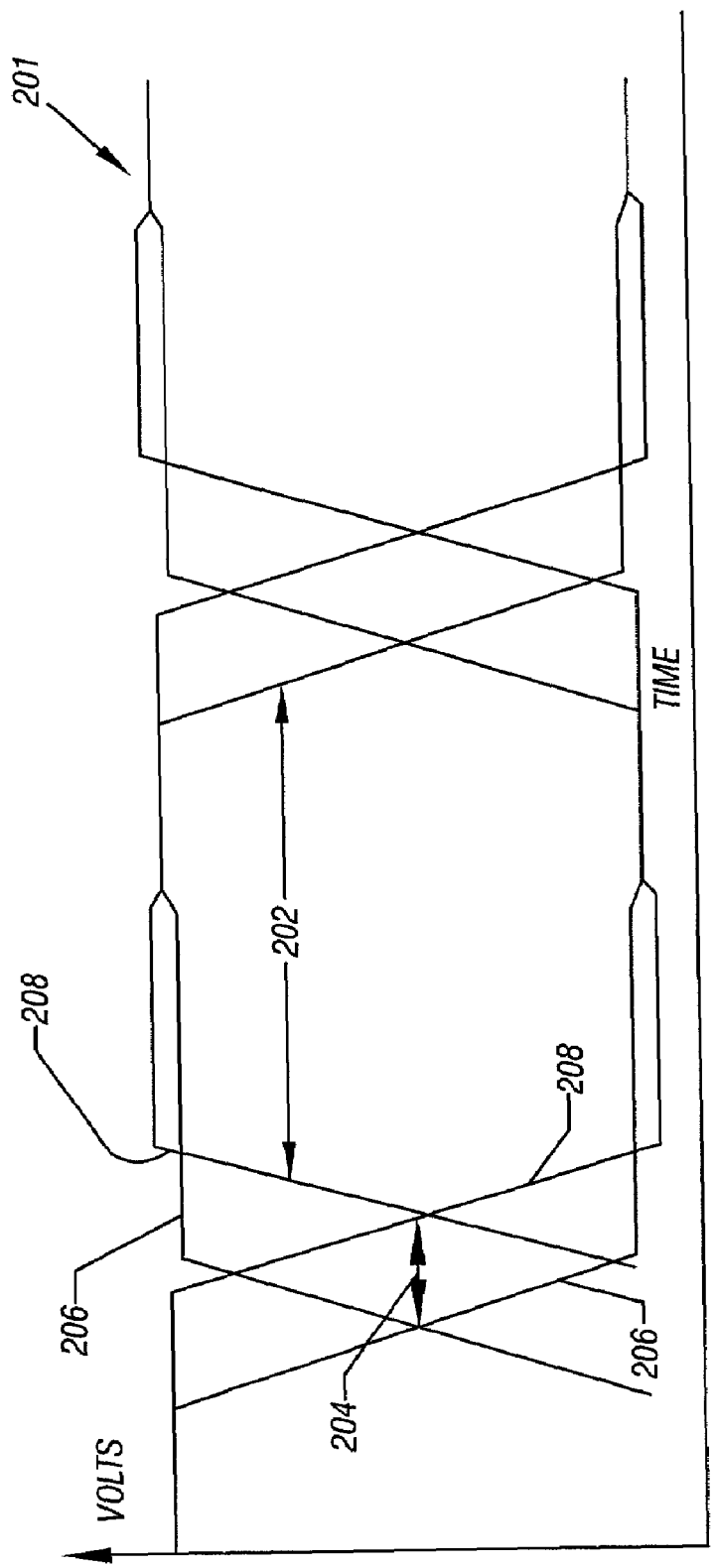
FIG. 2 is a timing diagram illustrating modal velocity changes on a bus.

Referring now to FIG. 2, a waveform 201 on a two-conductor bus is illustrated having an eye closure 202 and timing jitter 204. The timing jitter 204 may be caused by modal velocity changes induced by even or odd switching patterns on the two conductors. When data on both conductors are in phase, this may be considered an even mode. When data on the two conductors switch 180° out of phase, this may be considered odd mode.

The modal velocity changes may cause the transmission lines to have different time delays (TD) depending on the switching patterns. The closer the spacing of the buses, and the longer the lines are which comprise the buses, the greater the delay changes may be. The amount of timing jitter 204 may be affected therefore by the length of the bus lines and the switching phase of the signals on the bus lines. For even mode switching, the bus signals may be as illustrated by signal 206. For odd mode switching the timing may be as illustrated by signals 208.

As discussed above, each data pattern or word pattern, that represents a specific digital state on the bus, may introduce a particular propagation delay TD.

For a three-conductor bus, the middle conductor of the three-conductor bus may be significantly affected by its two adjacent neighbors. By considering only the two nearest conductors to a particular bus line, the majority of modal velocity effect may be accounted for because cross talk effects may fall off exponentially after the nearest neighbor.

Table 1 below illustrates six significant state changes that may occur on a three-conductor bus with an up arrow indicating a rising edge on a particular conductor of the bus and a down arrow indicating a falling edge on a particular conductor of the bus. While there are other state combinations possible on a three conductor bus, the other combinations may either be symmetrical or exactly opposite to the illustrated states in table 1 and therefore may be accounted for by the six illustrated states.

For each of the states illustrated in Table 1, a particular velocity or time delay may be associated with that state. The worst-case variations may be between odd and even states. For example, with respect to the middle conductor of a three conductor bus, the worst-case time delay may be associated with state two in Table 1 where a center conductor is switching 180° from its adjacent neighbors.

TABLE 1

| | |
|---|---|
| 1. | ↑↑↑ Even state |
| 2. | ↑↓↑ Odd state |
| 3. | ↑↑↓ 2-bit even, 1 bit odd state |
| 4. | ↑↑0 2-bit even state |
| 5. | ↑↓0 2-bit odd state |
| 6. | 0↑0 2-bit even, 1 bit odd state |

The actual velocities associated with each of the six states for a particular motherboard may be either determined from the physical motherboard geometries, or with a series of calibration steps that may drive different patterns onto the bus to record the propagation delays. In this manner, the particular delays associated with each bus state may be determined and recorded for use in equalizing the time delays on the bus.

In some embodiments, the determined propagation may be stored in a memory device. The contents of the memory device may then be referenced (looked up) to determine the amount of delay that may occur or the amount of delay that may be useful for inserting in one or more particular conductors of the bus to compensate, at least in part, for the modal velocity effects of a particular data pattern on the bus.

Figure 3:
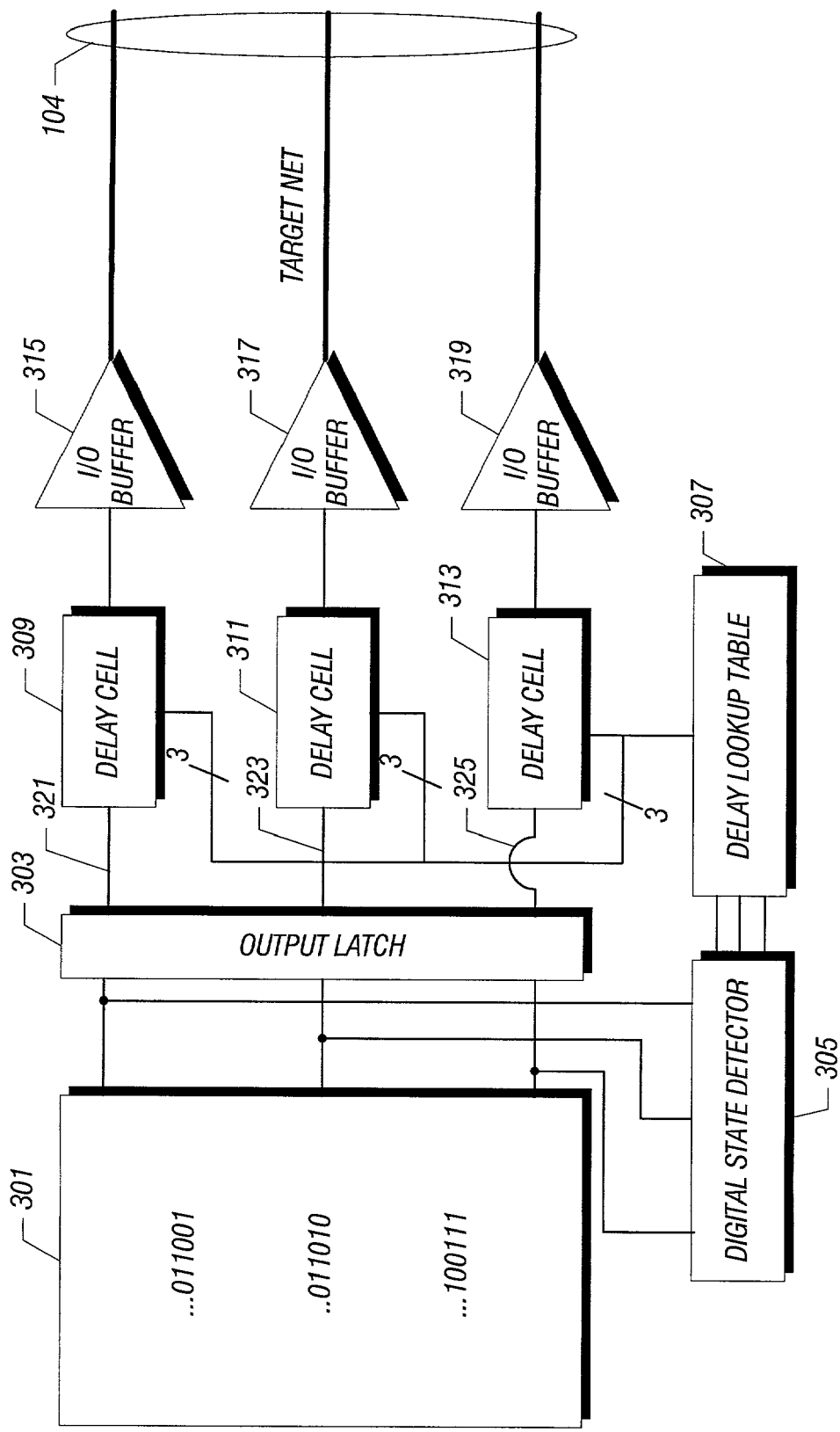
FIG. 3 illustrates a block diagram of an equalization circuit according to an embodiment of the present invention.

Referring now to FIG. 3, the modal velocity equalization circuit 103 is illustrated where incoming data 301, such as may be source by microprocessor 102, may be latched by output latch 303 in some embodiments. The input data 301 may also be coupled to a digital state detector 305 which in turn may be coupled to a delay look up table 307. The delay look up table 307 may be coupled to delay cells 309 through 313. An output from each delay cell 309–313 may be in turn coupled to an I/O buffer 315–319. Delay cells 309–313 may also have inputs 321–325 coupled to output latch 303. I/O buffers 315–319 may have outputs coupled to a bus such as, for example, bus 104.

In some embodiments, the output latch 303 may serve to stabilize and hold the input data from the microprocessor 102. The I/O buffers 315–319 may be provided in some embodiments to drive the input data from the microprocessor 103, that are delayed by the delay cells 309–313, onto the host bus 104.

The equalization circuit 103 may compensate for data jitter on a bus such as induced by modal velocity changes by looking at each incoming word such as from data input data 301. In some embodiments, each incoming word may be evaluated bit by bit to determine the propagation delay that may correspond to that particular data state and adjusting the delay by delay cells 309–313 to reduce cross talk induced delay on bus 104.

The incoming data 301 may be evaluated by the digital state detector 305 which may output a particular bit pattern to the delay look up table 307 in some embodiments. The delay look up table may be, as one example, a memory device that may contain entries that may represent desired delay times for a particular input data word (state) such as from incoming data 301. The lookup table 307 may in response to a particular incoming data word bit pattern output, in some embodiments, 1 of 6 binary pattern outputs to the delay cells 309–313 that may equalize bus states such as illustrated in table 1. The delay cells 309–313 may in turn, in some embodiments, introduce 1 of 6 delay times to reduce effects of modal velocity changes of the input data word when driven on the bus 104.

Of course, while an equalization circuit for a three-conductor bus has been illustrated, this method and apparatus may be extended as desired to equalize modal velocity changes on N-conductor busses. Additionally, while digital state detector 305 and delay look up table 307 are illustrated as separate devices, in some embodiments, the two functions may be combined in one device.

Figure 4:
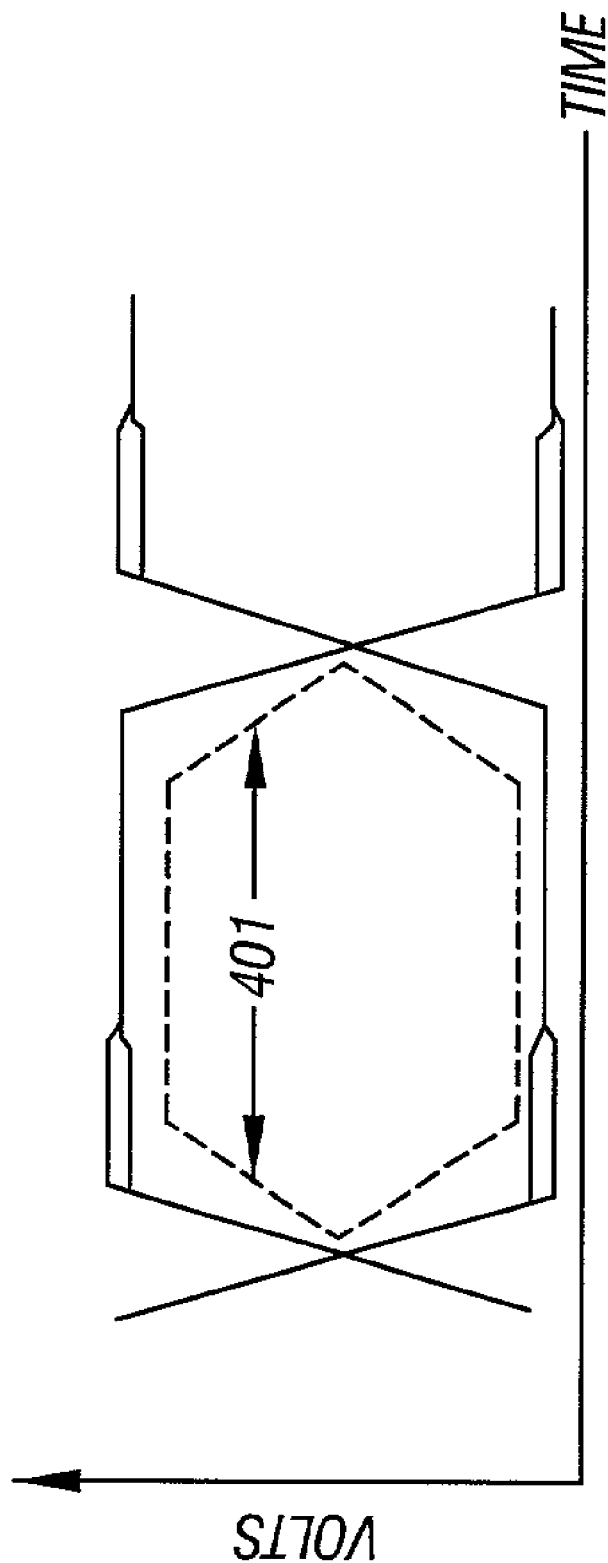
FIG. 4 illustrates data on a data bus after time domain equalization in accordance with an embodiment of the present invention.

Referring now to FIG. 4, an eye closure pattern 401 is illustrated for a two-conductor bus similar to that in FIG. 2. By equalizing the modal velocity changes such as by circuit 103 described above, the eye opening 401 may be expanded when compared to that of eye closure 202 of FIG. 2. This increased eye area may, in some embodiments, be achieved by minimizing the jitter 204, as illustrated in FIG. 2, by equalizing the modal velocities on a bus such as bus 104. While the two-connector bus is illustrated for reasons of simplicity, circuit 103 may be utilized, in some embodiments, for busses having N-conductors.

While the present invention has been described with respect to a limited number of embodiments, those skilled in the art will appreciate numerous modifications and variations therefrom. For example, equalization may be applied to other busses. It is intended that the appended claims cover all such modifications and variations as fall within the true spirit and scope of this present invention.

What is claimed is:

1. A method comprising:
   receiving a data input corresponding to a data pattern of a digital state of at least three conductors of a multi-conductor bus;
   detecting the data pattern;
   selecting a propagation delay time from a plurality of delay times based on the data pattern to equalize the received data input for crosstalk between the received data input on the at least three conductors; and
   transmitting the received data input on the multi-conductor bus delayed by at least the selected propagation delay time.

2. A method as in claim 1 wherein detecting the data pattern includes outputting, by a state detector, a state value to a lookup device in response to the received data input.

3. A method as in claim 2 further comprising the lookup device outputting control information to at least one delay cell in response to the output of the state detector.

4. A method as in claim 3 wherein the at least one delay cell selects a delay from a plurality of delays in response to the control information.

5. A method as in claim 4 wherein each of a plurality of delay cells delay the digital state of a conductor of the multi-conductor bus.

6. A method as in claim 1 further comprising receiving the data input from a processor.

7. The method of claim 1, further comprising equalizing the data input for velocity changes dependent upon the data pattern.

8. An apparatus comprising:
   a plurality of delay cells each having multiple propagation delay times, the plurality of delay cells having inputs to receive data of a multi-conductor bus; and
   a state detector to receive the data of the multi-conductor bus and to control the plurality of delay cells in response to a pattern of the data wherein the pattern of the data corresponds to a modal velocity change for a first conductor, a second conductor, and a third conductor of the multi-conductor bus.

9. The apparatus of claim 8, wherein the state detector is to output a control signal to each of the plurality of delay cells, wherein the control signal is to select one of the multiple propagation delay times for the associated delay cell.

10. The apparatus of claim 9, wherein the state detector includes a lookup device to output the control signal to each of the plurality of delay cells.

11. The apparatus of claim 10, wherein the lookup device comprises a programmable memory, wherein the programmable memory is programmed with calibration values obtained from a calibration routine for the multi-conductor bus.

12. The apparatus of claim 8, further comprising a buffer coupled to an output of each of the plurality of delay cells to transmit the data on the multi-conductor bus.

13. The apparatus of claim 12, further comprising a latch having an input to receive the data from a processor and an output to provide the data to the plurality of delay cells.

14. A system comprising:
a processor;
an equalizer coupled to the processor, the equalizer including:
a plurality of delay cells each having multiple propagation delay times, the plurality of delay cells including an input to receive a data signal of a multi-conductor bus; and
a state detector to receive the data signal of the multi-conductor bus and to control the plurality of delay cells in response to a state of the multi-conductor bus to equalize the data signal according to a delay associated with the state wherein the equalizer is to reduce modal velocity changes of the datd signal when drivenon the multi-conductor bus; and
a dynamic random access memory (DRAM) coupled to the equalizer.

15. The system of claim 14, wherein the state detector is to output a control signal to each of the plurality of delay cells, wherein the control signal is to select one of the multiple propagation delay times for the associated delay cell.

16. The system of claim 15, wherein the state detector includes a lookup device to output the control signal to each of the plurality of delay cells.

17. The system of claim 16, wherein the lookup device comprises a programmable memory, wherein the programmable memory is programmed with calibration values obtained from a calibration routine for the multi-conductor bus.

18. The system of claim 14, wherein the state of the multi-conductor bus is variable based on a state of the data signal.

19. The system of claim 14, further comprising a buffer coupled to an output of each of the plurality of delay cells to transmit the data signal on the multi-conductor bus.

20. The system of claim 19, further comprising a latch including an input to receive the data signal from a processor and an output to provide the data signal to the plurality of delay cells.

* * * * *

UNITED STATES PATENT AND TRADEMARK OFFICE
CERTIFICATE OF CORRECTION

PATENT NO. : 7,020,792 B2 Page 1 of 1
APPLICATION NO. : 10/135131
DATED : March 28, 2006
INVENTOR(S) : Hall It is certified that error appears in the above-identified patent and that said Letters Patent is hereby corrected as shown below:

Column 6:
Line 1, "datd" should be --data--;
Line 2, "drivenon" should be -- driven on --

Signed and Sealed this

First Day of August, 2006

JON W. DUDAS
*Director of the United States Patent and Trademark Office*